M. A. ANDES.
UTENSIL HANDLE GUARD.
APPLICATION FILED JULY 16, 1920

1,375,271.

Patented Apr. 19, 1921.

M. A. Andes,
Inventor,

By C. C. Hines.
Attorney

UNITED STATES PATENT OFFICE.

MYRTLE A. ANDES, OF HUNTINGTON, WEST VIRGINIA.

UTENSIL-HANDLE GUARD.

1,375,271.    Specification of Letters Patent.    Patented Apr. 19, 1921.

Application filed July 16, 1920. Serial No. 396,774.

*To all whom it may concern:*

Be it known that I, MYRTLE A. ANDES, a citizen of the United States, residing at Huntington, in the county of Cabell and State of West Virginia, have invented new and useful Improvements in Utensil-Handle Guards, of which the following is a specification.

This invention relates to a guard or protector for the handles of cooking utensils, such as coffee or tea pots, percolators and the like, one object of the invention being to provide a guard which is simple and inexpensive in construction and adapted to be applied to any ordinary utensil of the character described to prevent undue heating of the utensil handle and protect it from damage from the flames of an open fire.

Another object of the invention is to provide a guard having a heat-insulating material, such as asbestos, confined therein whereby its efficiency is increased, and also to provide a novel form and arrangement of guard whereby an effective air space is produced between the guard and handle to further shield and protect the latter and prevent the hand of a person manipulating the utensil from being burned.

The invention consists of the features of construction, combination and arrangement of parts, hereinafter fully described and claimed, reference being had to the accompanying drawing, in which:

Figure 1:
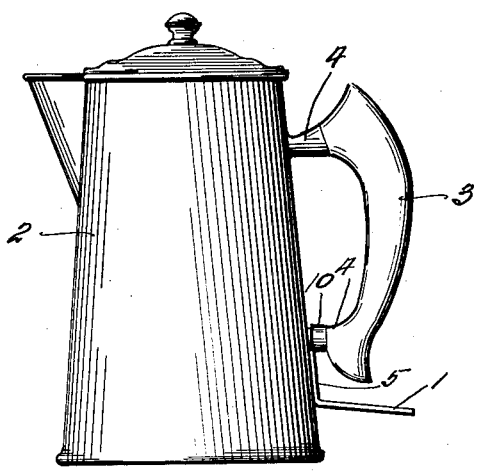
Figure 1 is a side elevation of a coffee pot, showing the application of my invention thereto.
Figure 2:
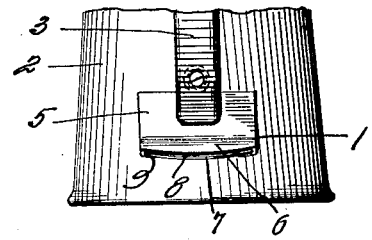
Fig. 2 is a rear elevation of the same.
Figure 3:
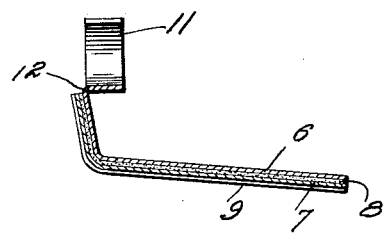
Fig. 3 is a vertical longitudinal section through the device.
Figure 4:
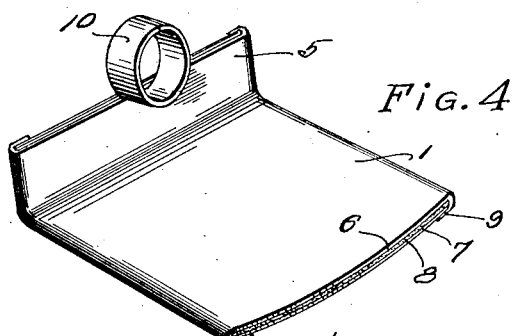
Fig. 4 is a perspective view of the guard detached.
Figure 5:
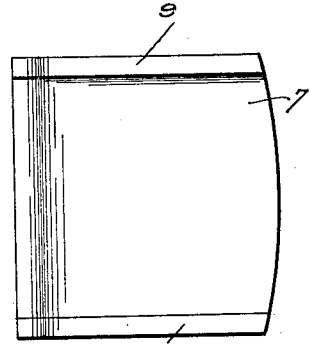
Fig. 5 is a bottom plan view thereof.

In its illustrated disclosure, I have shown my improved guard 1 in connection with a coffee pot 2 of conventional construction, the handle 3 of which pot is disposed vertically at one side thereof and provided with arms 4, near its upper and lower ends, which are secured to the adjacent side of the pot body in any suitable manner.

The guard 1 comprises a plate arranged beneath the lower end of the handle 3 at an elevation above the bottom of the pot 2 and extending outwardly from the adjacent side of the wall of the pot. The said guard plate is provided at its inner end with an upwardly bent attaching portion 5 coextensive in width therewith and arranged substantially at an oblique angle thereto. Said attaching portion 5 lies in a substantially vertical plane adjacent to the wall of the pot, and the body of the guard plate thence extends outwardly and downwardly at an angle to the pot and at an oblique angle to the plane of the attaching portion 5, so that its outer portion, which lies below the lower end of the handle 3, will be spaced a considerable distance from the handle.

By the construction and arrangement of the guard as above described it will be seen that the guard is arranged in an inclined position to serve as a deflector, whereby the flames and products of combustion from an open burner will be diverted from the handle, thus preventing the handle from being unduly heated, burned or otherwise damaged, and furthermore the guard plate is also so disposed that it lies well below the handle to avoid liability of the burning of the hand of a person grasping the handle. Such arrangement additionally provides a free air space between the guard plate and handle of considerable depth, tending to prevent transmission of the heat from the plate to the handle. By the described inclination of the body of the plate the inner end of the guard body may be arranged in close proximity to the lower arm 4 of the handle, obviating the necessity of making the attaching portion 5 of considerable depth to extend downwardly to bring the guard body in such spaced relationship to the handle, whereby economy of material in the manufacture of the guard is insured.

Figure 6:
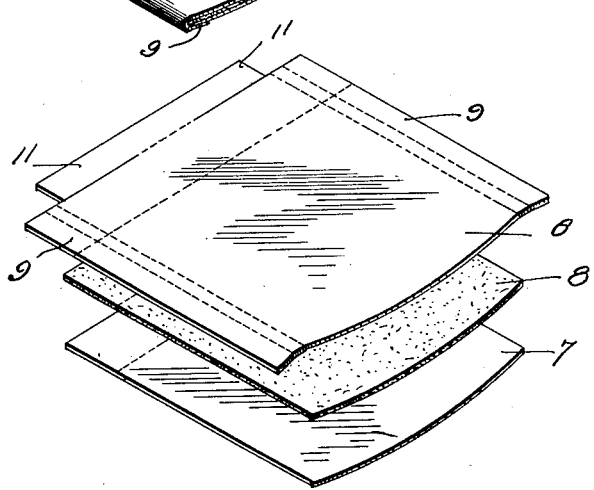
Fig. 6 is a perspective view of the parts of the guard as they appear prior to assemblage.

In accordance with my invention, the guard is made up of a pair of superposed plies 6 and 7 of metal and an intermediate ply or layer 8 of a suitable heat insulating material, such as asbestos. This heat insulating intermediate layer serves to prevent the transmission of heat from the flames striking the lower plate 7, so that the upper plate 6 will be maintained in a comparatively cool condition, thus further avoiding liability of injury to the handle and of the hand of a person manipulating the coffee pot. The upper plate 6 is stamped from a blank of the initial form shown in Fig. 6, from which it will be seen that said blank is somewhat wider than the layers 7 and 8, which are coextensive in width with each other. The longitudinal edge portions of the plate 6 are thus adapted to provide flanges 9 which may be bent under the plate 7 and clenched against the under side thereof to hold the component parts 6, 7 and 8 together. By this means an inexpensive construction of guard is provided which is economical of manufacture and of an exceedingly strong and durable character.

The guard is adapted to be supported in position by means of a loop or eye 10 formed integral with one of the plates 6 or 7. In the present instance this loop is formed by slitting the blank from which the plate 6 is made transversely on opposite sides of its medial portion, thus forming bent fingers 11 connected to the plate 6 by an intermediate intact portion 12, which is adapted to be bent at an angle to the attaching portion 5 to dispose the fingers so that they may be bent around the lower arm 4 of the handle to form a loop or eye embracing the same, by which the guard is supported in position. By this construction the guard is adapted for attachment to any ordinary type of cooking utensil of the character described in which arms extend from the handle for attaching the same to the body of the pot.

Having thus fully described my invention, I claim:

A guard for utensil handles comprising an upper plate having an end portion bent at right angles thereto, said plate being provided with side flanges bent under the same, the angularly bent end of the plate being provided with fingers separated partially therefrom on transverse lines and coöperatively bent to form a securing loop, a lower plate held in parallel relation to the upper plate by said flanges, and a layer of heat non-conducting material clamped between said plates.

In testimony whereof I affix my signature.

MYRTLE A. ANDES.